US006655013B2

(12) United States Patent
Wilson et al.

(10) Patent No.: US 6,655,013 B2
(45) Date of Patent: Dec. 2, 2003

(54) TERMINAL APPLICATOR FOR ATTACHING FLAG TERMINALS

(75) Inventors: Richard Orley Wilson, Harrisburg, PA (US); Russell Thomas Diven, Harrisburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 63 days.

(21) Appl. No.: 09/875,239

(22) Filed: Jun. 6, 2001

(65) Prior Publication Data

US 2002/0184753 A1 Dec. 12, 2002

(51) Int. Cl.[7] ................................................ B23P 19/00
(52) U.S. Cl. ............................ 29/751; 29/753; 29/763; 29/33 M; 72/413; 72/712; 72/446
(58) Field of Search .......................... 29/751, 753, 754, 29/863, 845, 566.2, 566.4, 33 M, 882; 72/470, 712, 446, 338, 457, 461, 413

(56) References Cited

U.S. PATENT DOCUMENTS 3,965,559 A * 6/1976 Mazzola ................ 29/203 DT
5,174,022 A * 12/1992 Phillips et al. ................ 29/683
5,575,061 A * 11/1996 Tsuji et al. .................. 29/863
5,737,830 A * 4/1998 Yeomans ..................... 29/753
5,799,391 A * 9/1998 Tillotson ..................... 29/753
5,909,913 A * 6/1999 Fitz, Jr. et al. ............... 29/753
6,276,052 B1 * 8/2001 Avenoso et al. .............. 29/751
6,327,775 B1 * 12/2001 Oishi et al. .................. 29/751
6,367,148 B1 * 4/2002 Caveney et al. .............. 29/573
2002/0184753 A1 * 12/2002 Wilson et al. ................ 29/751

* cited by examiner

*Primary Examiner*—Carl J. Arbes
*Assistant Examiner*—Minh Trinh

(57) ABSTRACT

A terminal applicator (50) for attaching an electrical flag terminal (2) to a wire (54) includes a wire guide (74) and crimping tooling (70, 72) attached to and carried by a ram (68). The wire guide has a wire guiding surface (100) that cooperates with lead in angled surfaces (92, 98) of the crimping tooling (70, 72) to guide the wire into alignment with the terminal. The lead in angled surfaces of the tooling are typically limited to the side of the terminal opposite the receptacle portion (4) while the wire guide surface is positioned on the same side as the receptacle portion.

15 Claims, 6 Drawing Sheets

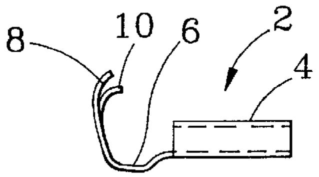
Fig. 3
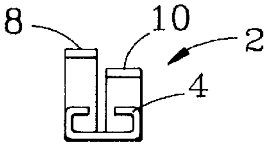
Fig. 4
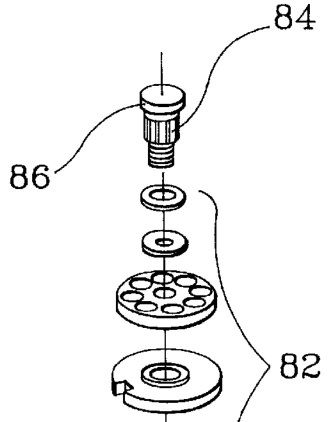
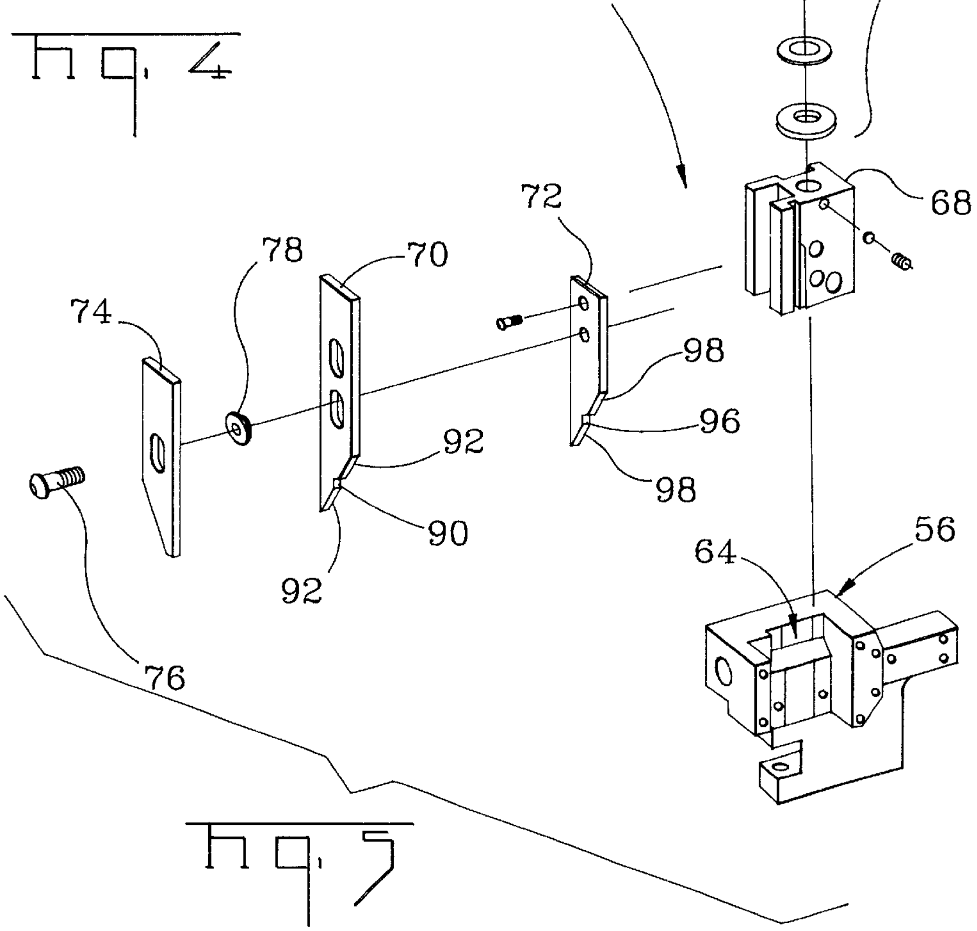
Fig. 5

TERMINAL APPLICATOR FOR ATTACHING FLAG TERMINALS

The present invention relates to an applicator machine for attaching an electrical terminal to a wire and more particularly to a wire guide carried by the ram of the machine for guiding a wire into position for crimping a single sided flag terminal thereto.

BACKGROUND OF THE INVENTION

Terminal applicator machines are widely used in the industry to attach electrical terminals to conductors. These terminal applicators are typically secured in a press which supplies the power and motion that operates the applicator. The applicator may be used manually where an operator inserts an already prepared wire end into the crimping area between a crimping tool and an anvil containing a terminal and holds the wire in place while activating the press to complete the termination. Alternatively, the terminal applicator and associated press may be attached to a host machine, such as a lead maker, where the prepared wire end is automatically presented to the applicator tooling for termination. These terminal applicators typically feed a strip of terminals along a guide rail into a workstation where one of the terminals is positioned over an anvil. The wire, its end having been previously stripped of insulation, is positioned in the workstation and the apparatus is activated to cause crimping tools to engage and crimp the tabs of the terminal onto the end of the wire.

The terminal typically has four tabs, two of which are on each side of the barrel. The tabs are rolled over onto the insulation and the conductor during the crimping process. Prior to crimping, the tabs on opposite sides form a lead in to help guide the wire from a target area within which the wire is placed, into crimping position in the barrel of the terminal. Additionally, the crimping tooling usually has a V-shaped lead in that helps to guide the wire as well. The target area within which the wire must be placed is relatively large, and the host machine typically can easily position the wire within this area.

However, certain types of terminals, known as flag terminals, are configured with the tabs to be crimped on only one side of the terminal. See, for example, FIGS. 3 and 4 where there is shown a flag terminal 2 having a receptacle contact 4, a barrel 6, an insulation tab 8 and a conductor tab 10. The outer tip of the conductor tab 10 extends directly over a portion of the barrel 6, as viewed in FIG. 3, which directly interferes with normal seating of the conductor within the barrel 6 unless the conductor is positioned within a very small target zone. This configuration requires that the crimping tooling be relieved on the side opposite the tabs, eliminating the normal V-shaped lead in. See FIG. 2A for a schematic representation of prior art crimping tooling of this type.

When positioning a wire with respect to the terminal 2 for crimping, it must be positioned within a well defined target zone 16 which falls between the two phantom lines 18 and 20, in FIG. 2A. The phantom line 18 defines the upper most position from which the wire can be guided into the barrel 6, the tabs 8 and 10 define the left most position, while the phantom line 20 defines the right most position. An insulation crimping tool 26 includes a lead in angled surface 28 that extends on both sides of a crimping nest 30. Similarly, a conductor crimping tool 34 includes a lead in angled surface 36 that extends on both sides of a conductor crimping nest 38. During the downward crimping stroke of the ram these angled surfaces 28 and 36 will engage and guide the tips of the tabs 8 and 10 toward and into the nests 30 and 38.

Note that, in the event that the wire is inadvertently positioned above the phantom line 18, the wire will enter the nests 30 and 38 before the tips of the tabs, resulting in a failed crimp. The net result of this over extending tip 10 and the lack of lead in on the right most side of the tooling is that the area of the target zone 16, the area within which the conductor must be placed in order for the crimping tooling to pick it up and center it in the barrel 6, is substantially reduced from what it would be with conventional terminals having straight tabs on opposite sides of the terminal. This reduced target area is a serious detriment in an automated environment where the host machine must consistently and accurately position the conductor within that reduced target area. Achieving this accuracy substantially increases the cost of the host machine and can reduce its cycle time, thereby reducing its efficiency.

What is needed is a terminal applicator machine having a simple and inexpensive wire guide that permits a substantially larger target area while assuring that the wire is properly guided into the barrel during the crimping cycle.

SUMMARY OF THE INVENTION

A terminal applicator is provided for attaching an electrical flag terminal to a conductor. The flag terminal is of the type having a crimping tab extending from only a single side thereof. The terminal applicator includes a frame and an anvil supported by the frame and arranged to receive a flag terminal. A ram, having crimping tooling attached thereto, is in sliding engagement with the frame and is arranged to undergo reciprocating motion carrying the crimping tooling along a first axis in a crimping direction into crimping engagement with the flag terminal on the anvil and in an opposite return direction away from the anvil. The crimping tooling has a crimping nest for forming the crimping tab in cooperation with the anvil. The first axis extends at least from the crimping nest to the anvil. The crimping tooling includes a lead in surface that is adjacent the crimping nest and extends therefrom away from the first axis toward the anvil. A wire guide is attached to and carried by the ram adjacent the crimping tooling. The wire guide has a wire guiding surface on a side of the first axis opposite the lead in surface. The wire guiding surface is adjacent the crimping nest and extends therefrom away from the first axis toward the anvil.

An embodiment of the invention will now be described by way of example with reference to the following drawings.

DESCRIPTION OF THE DRAWINGS

FIG. 3 is a front or end view of an electrical flag terminal of the type utilized by the applicator shown in FIG. 1;

FIG. 4 is a side view of the terminal shown in FIG. 3;

FIG. 5 is an exploded parts view of the ram assembly shown in FIG. 1;

FIGS. 6, 7, 8, and 9 are similar front views of a portion of the crimping tooling shown in FIG. 2, showing the tooling in various positions during its operating cycle.

DESCRIPTION OF AN EMBODIMENT OF THE INVENTION

Figure 1:
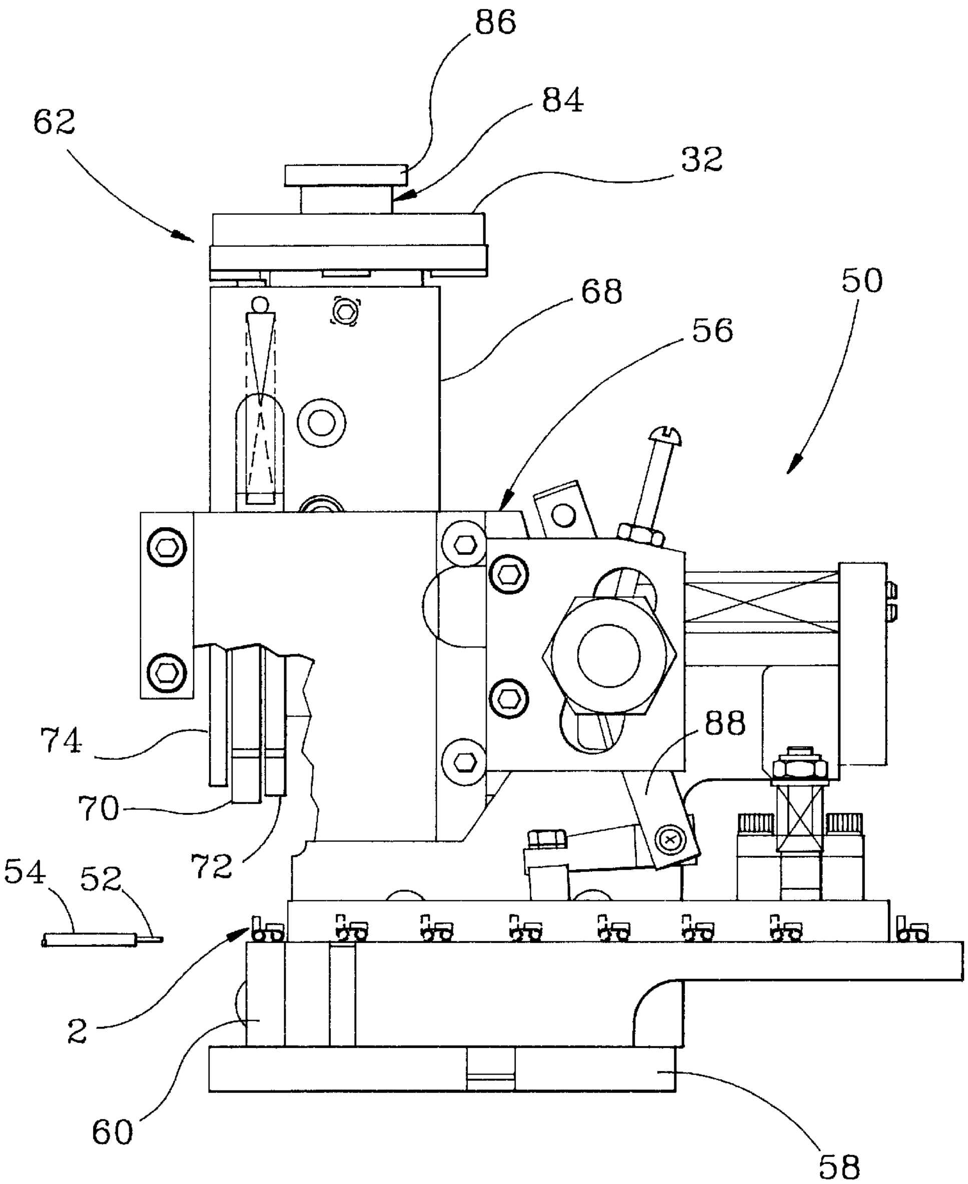
FIG. 1 is a side view of a terminal applicator incorporating the teachings of the present invention.
Figure 2:
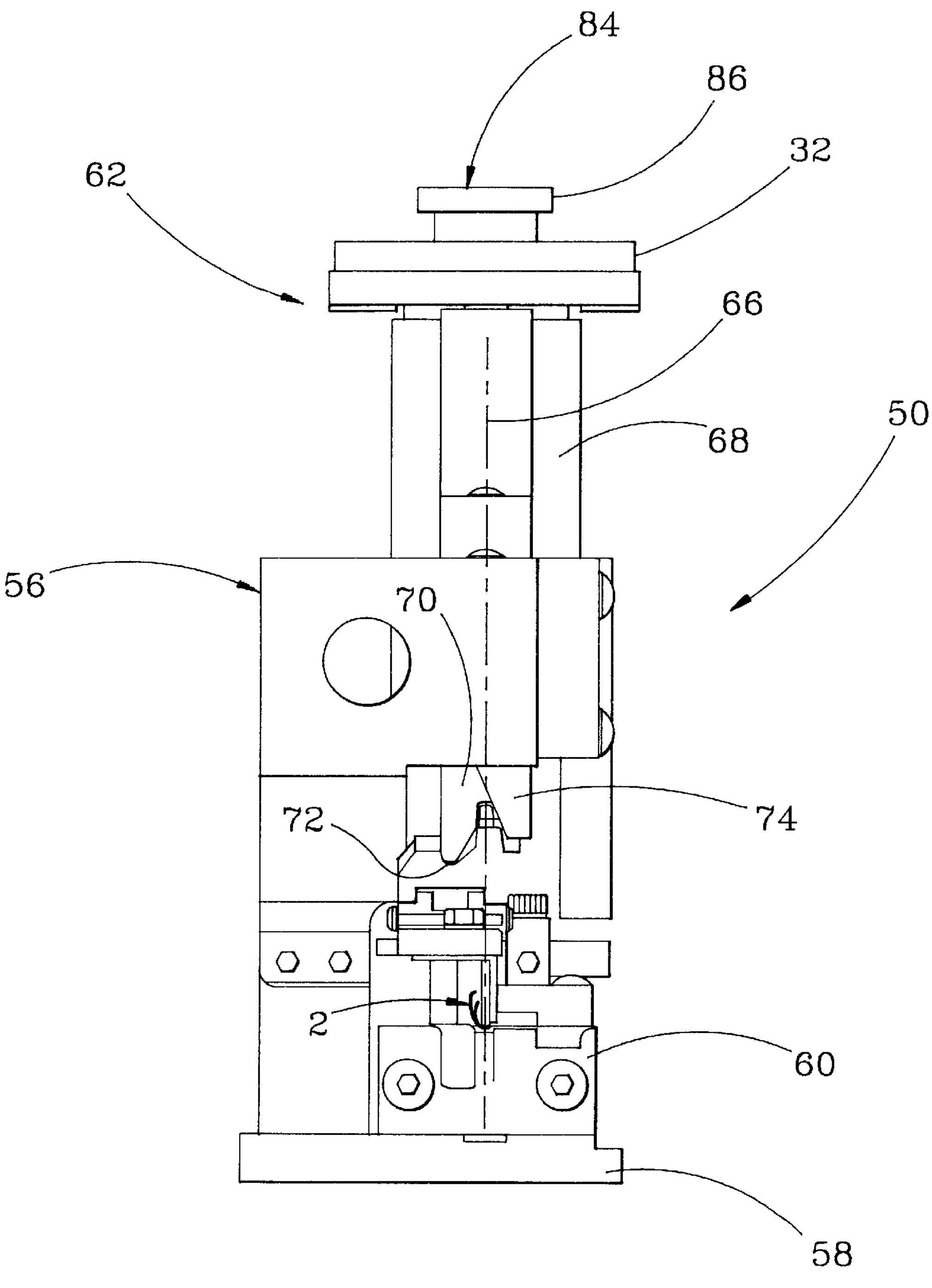
FIG. 2 is a front view of the applicator shown in FIG. 1.

There is shown in FIGS. 1 and 2 a terminal applicator 50 for crimping an electrical terminal 2 onto a conductor 52 of a wire 54. The applicator includes a frame 56, base 58 that supports an anvil 60, and a ram assembly 62 that is in sliding engagement within an opening 64 in the frame, shown in FIG. 5, and is arranged to undergo reciprocating movement in a crimping direction toward the anvil and away therefrom along a vertical axis of movement 66 or first axis, as best seen in FIG. 2. The ram assembly 62, as best seen in FIG. 5, comprises a ram 68 which carries tooling that includes an insulation crimping tool 70, a conductor crimping tool 72, and a wire guide 74, all of which are attached to the ram by means of a screw 76. The screw 76 extends through a hole in the wire guide 74, a spacer 78, an elongated hole in the insulation crimping tool 70, a hole in the conductor crimping tool 72, and into a threaded hole in the ram 68. A crimp height adjust mechanism 82 is coupled to the ram 68 by means of a shoulder coupling screw 84 that is threaded into a hole in the ram in the usual manner. The shoulder coupling screw 84 includes a coupling head 86 that couples the ram assembly 62 to a press ram of a host machine, not shown. When the press ram of the host machine is actuated, it imparts reciprocating motion to the ram 68. A terminal feed mechanism 88 is coupled to the frame 56 and is actuated by the ram 68 to incrementally feed a strip of terminals 2, in the usual manner, so that a new terminal 2 is positioned on the anvil for the next crimping cycle.

Figure 2B:
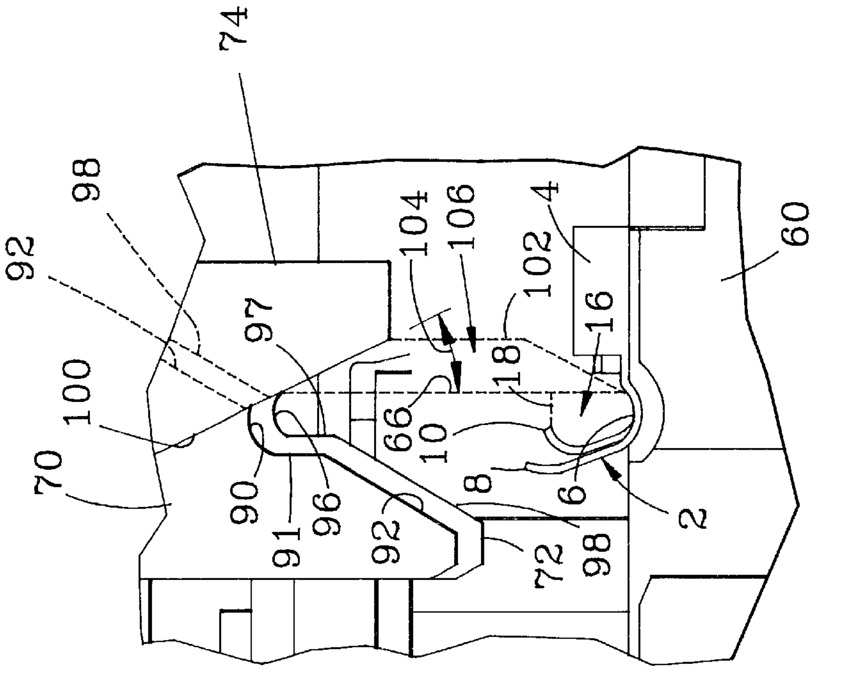
FIG. 2B is a front view of a portion of the terminal applicator shown in FIG. 2.

A portion of the terminal applicator 50, taken from FIG. 2, is shown in FIG. 2B. However, in FIG. 2B the crimping tooling is positioned just above the terminal 2 so that it is comparable to the schematic representation of the prior art tooling shown in FIG. 2A. As best seen in FIGS. 2B and 5, the insulation crimping tool 70 includes an insulation crimping nest 90 having a vertical null surface 91 formed in an angled surface 92 that extends on both sides of the nest, the null surface 91 being spaced from the vertical axis of movement 66. The portion of the angled surface 92 that extends from the null surface 91 of the nest 90 downwardly and to the left, as viewed in FIG. 2B, acts as a lead-in for guiding the insulation tab 8 into the crimping nest 90 during the crimping stroke of the ram 68. The portion of the angled surface 92 that extends from the nest 90 upwardly and to the right, as viewed in FIG. 2B, is simply a clearance portion to prevent interference with the contact 4 as the tab 8 is being crimped.

Similarly, the conductor crimping tool 72 includes a conductor crimping nest 96 having a vertical null surface 97 formed in an angled surface 98 that extends on both sides of the nest. The vertical axis of movement 66 of the ram assembly 62 is adjacent the right most edge of the nest 96, as viewed in FIG. 2B, and spaced from the null surface 97. The portion of the angled surface 98 that extends from the null surface 97 of the nest 96 downwardly and to the left, as viewed in FIG. 2B, is on the left most side of the axis 66 and extends away from the axis and toward the anvil 60. This portion of the angled surface acts as a lead in for guiding the conductor tab 10 into the crimping nest 96 during the crimping stroke of the ram 68. In a manner similar to that of the prior art mechanism shown in FIG. 2A, the upper most limit and left most limit for properly guiding the wire are indicated by the phantom lines 18 and the tabs 8 and 10, respectively, in both FIGS. 2A and 2B. The portion of the angled surface 98 that extends from the nest 96 upwardly and to the right, as viewed in FIG. 2B, is simply a clearance portion to prevent interference with the contact 4 as the tab 10 is being crimped. Note that the vertical axis of movement 66 is in a position with respect to the nest 96 similar to that of the phantom line 20 with respect to the nest 38 of the prior art mechanism. That is, the axis 66 and phantom line 20 are in identical positions with respect to their respective terminals and crimping tooling.

The wire guide 74 includes a lead in wire guiding surface 100 that is closely adjacent the upper right edge of the crimping nests 90 and 96, as viewed in FIG. 2B, and extends downwardly away from the vertical axis of movement 66 to the right and toward the anvil 60, thereby forming an angle 104 to the axis 66. Preferably, the angle 104 is from 15 to 45 degrees, most preferably about 25 degrees. This wire guiding surface 100 is on a side of the axis 66 opposite the angled surfaces 92 and 98 of the insulation and conductor crimping tools, as viewed in FIGS. 2 and 2B. The wire guide 74 is positioned to the left of both the conductor crimping tool and the insulation crimping tool, as shown in FIGS. 1 and 5. Therefore, the wire guide will remain clear of the terminal 2 during the entire crimping cycle. However, the wire guiding surface 100 of the wire guide can engage the wire 54, in the event that the wire is positioned to the right of the nests 90 and 96, and guide it toward and into alignment with the barrel 6 of the terminal 2. The lower right edge of the surface 100, as viewed in FIG. 2B, defines a right most limit, identified by the phantom line 102, from which the wire 54 can be properly guided toward and into alignment with the barrel 6.

Figure 2A:
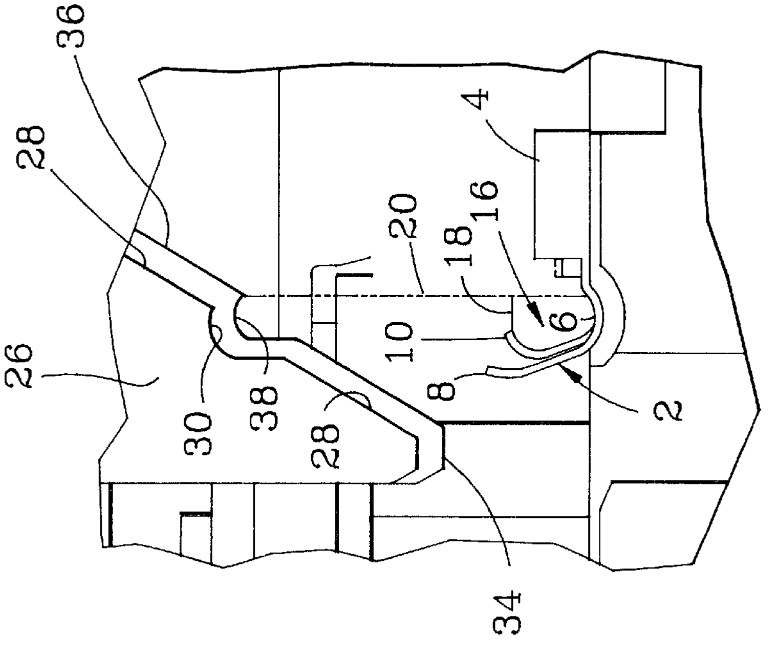
Fig. 2A (PRIOR ART)
FIG. 2A is a schematic representation of prior art crimping tooling.

As with the prior art apparatus shown in FIG. 2A, when positioning the wire 54 for crimping a terminal 2 thereto, the wire must be placed within a target zone that includes the target zone 16 that is limited on the top by the phantom line 18, on the left by the tabs 8 and 10, and on the right by the vertical axis of movement 66. However, in the case of the terminal applicator 50 shown in FIG. 2B, the area between the axis 66 and the phantom line 102 defines an additional target zone 106 within which a wire can be properly guided toward and into alignment with the barrel 6. The additional target zone 106 coupled with the target zone 16 provides an area within which the wire is to be positioned that is about three times as large as the area of the prior art target zone. This has a substantial positive affect on the design and construction of a host machine that must accurately position the wire 54 within the expanded target zone. Because of this expanded target zone, the positioning mechanism of the host machine can have wider tolerances and, in some cases, a shorter cycle time.

Figure 7:
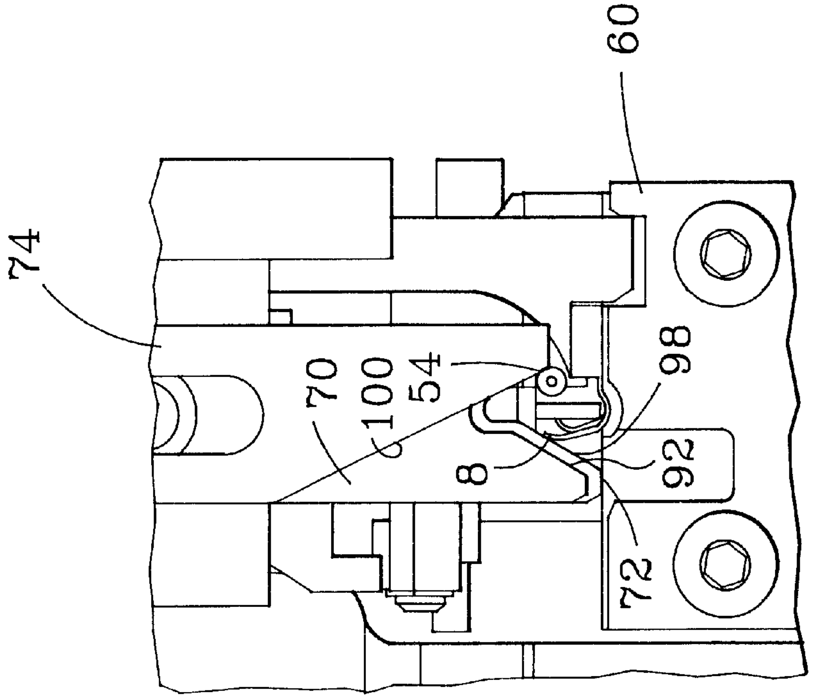
Figure 6:
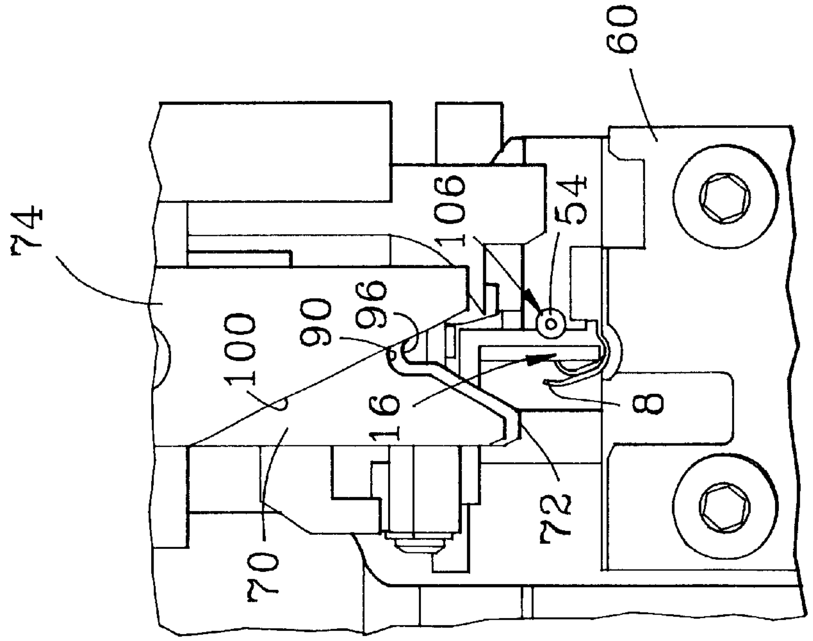
Figure 9:
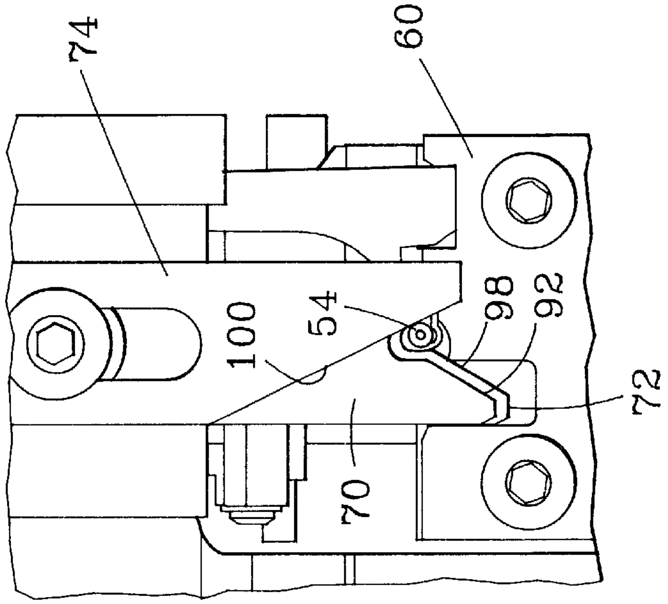
Figure 10:
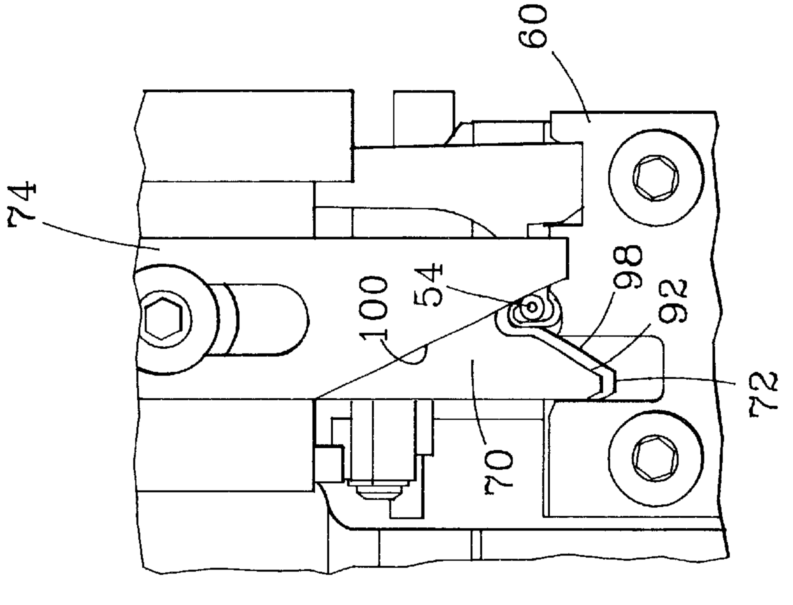

The operation will now be described with reference to FIGS. 1 and 6 through 9. As shown in FIG. 1, a terminal 2 is in crimping position on the anvil 60. A wire 54 is then positioned so that it's conductor 52 is directly over the crimping barrel 6 and within either of the target zones 16 or 106, in the present example the conductor is shown in the target zone 106 in FIG. 6. As the ram assembly 62 is made to move in the crimping direction toward the anvil 60, the angled surface 92 of the insulation crimping tool 70 engages the tip of the insulation tab 8 and begins to cam it toward the right and into alignment with the insulation crimping nest 90, as shown in FIG. 7. Concurrently, the wire guiding surface 100 of the wire guide 74 engages the outer surface of the insulation of the wire 54 in the target zone 106 and begins to cam the wire toward the left toward the axis 66 into vertical alignment with the barrel 6 and toward the anvil 60. As the ram assembly 62 continues to move toward the anvil 60 the insulation tab 8 is urged further to the right so that it enters the crimping nest 90 while the angled surface 98 of the conductor crimping tool 72 engages and cams the tip of the conductor tab 10 into the conductor crimping nest 96. Concurrently, the surface 100 of the wire guide 74 cams the wire 54 into direct alignment between the barrel 6 and the crimping nests 90 and 96, as shown in FIG. 8. As the ram assembly is moved to the bottom of its stroke, as shown in FIG. 9, the insulation tab 8 and the conductor tab 10 are crimped onto the wire 54 and its conductor 52, respectively. The ram assembly 62 is then returned to its starting position, as shown in FIG. 1, and the process repeated as desired.

An important advantage of the present invention is that the cost of the host machine can be reduced because the larger target zone permits wider tolerances of the wire placement mechanism. Additionally, this wider tolerance will sometimes permit the machine to operate at a higher speed thereby reducing its cycle time. This is accomplished without a significant increase in the cost of the present terminal applicator. The wire guide of the present invention is simple to make and economical to maintain because it attaches to and is carried by the ram without any additional parts or supporting mechanisms.

What is claimed is:

1. A terminal applicator for attaching an electrical flag terminal to a conductor, said flag terminal having at least one crimping tab extending from only a single side thereof, said terminal applicator including: a frame; an anvil supported by said frame and arranged to receive said flag terminal; a ram, having crimping tooling attached thereto, in sliding engagement with said frame and arranged to undergo reciprocating motion carrying said crimping tooling along a first axis in a crimping direction into crimping engagement with said flag terminal on said anvil and in an opposite return direction away from said anvil; said crimping tooling having a crimping nest for forming said crimping tab in cooperation with said anvil, said first axis extending at least from said crimping nest to said anvil, and a lead in surface adjacent said crimping nest and extending away from said first axis toward said anvil, a wire guide attached to and carried by said ram adjacent said crimping tooling, said wire guide having a wire guiding surface on a side of said first axis opposite said lead in surface, said wire guiding surface being adjacent said crimping nest and extending away from said first axis toward said anvil; said wire guide surface comprising means for engaging and guiding the conductor toward said crimping nest, wherein said wire guide remains clear from the terminal during attachment of said terminal to the conductor.

2. The terminal applicator according to claim 1 wherein said wire guide and said crimping tooling are rigidly attached to said ram.

3. The terminal applicator according to claim 2 wherein said lead in surface and said wire guiding surface are arranged so that during said reciprocating motion in said crimping direction, said lead in surface engages an end of said tab and guides the end of the tab toward said first axis and said wire guide surface engages said conductor on a side of said first axis opposite said lead in surface and guides the conductor toward said first axis.

4. The terminal applicator according to claim 3 wherein said crimping nest includes a null surface spaced from said first axis, and wherein said lead in surface begins at said null surface.

5. The terminal applicator according to claim 4 wherein said crimping nest includes a clearance portion on a side of said first axis opposite to said null surface.

6. The terminal applicator according to claim 5 wherein said wire guiding surface is angled with respect to said first axis so that during said motion of said ram in said crimping direction, said conductor is urged to concurrently move toward said first axis and said anvil.

7. The terminal applicator according to claim 6 wherein said wire guiding surface forms an angle of about 15 to about 45 degrees with said first axis.

8. The terminal applicator according to claim 7 wherein said wire guiding surface forms an angle of about 25 degrees with said first axis.

9. A terminal applicator for attaching an electrical flag terminal to a conductor, said flag terminal having at least one crimping tab extending from only a single side thereof, said terminal applicator including:

(1) crimping tooling including a bar having a crimping nest, and an anvil;

(2) a ram carrying said bar so that said bar is in reciprocating motion along a first axis toward and away from said anvil, said bar having a lead in surface on only one side of said crimping nest; and (3) a wire guide attached to and carried by said ram adjacent said crimping tooling, said wire guide having a wire guiding surface adjacent said crimping nest and in opposing relation to said lead in surface, said wire guide surface comprising means for engaging and directing said conductor toward said crimping nest, wherein said wire guide remains clear from the terminal during attachment of the terminal to said conductor.

10. The terminal applicator according to claim 9 wherein said first axis extends at least from said crimping nest to said anvil, and wherein said lead in surface and said wire guiding surface are arranged so that during said reciprocating motion in said crimping direction, said lead in surface engages an end of said tab and guides the end of the tab toward said first axis and said wire guide surface engages said conductor on a side of said first axis opposite said lead in surface and guides the conductor toward said first axis.

11. The terminal applicator according to claim 10 wherein said crimping nest includes a null surface spaced from said first axis, and wherein said lead in surface begins at said null surface.

12. The terminal applicator according to claim 11 wherein said crimping nest includes a clearance portion on a side of said first axis opposite to said null surface.

13. The terminal applicator according to claim 12 wherein said wire guiding surface is angled with respect to said first axis so that during said motion of said ram toward said anvil, said conductor is urged to concurrently move toward said first axis and said anvil.

14. The terminal applicator according to claim 13 wherein said wire guiding surface forms an angle of about 15 to about 45 degrees with said first axis.

15. The terminal applicator according to claim 14 wherein said wire guiding surface forms an angle of about 25 degrees with said first axis.

* * * * *